United States Patent [19]
Smithers

[11] Patent Number: 6,130,914
[45] Date of Patent: Oct. 10, 2000

[54] COMMUNICATIONS SYSTEM

[75] Inventor: Colin Richard Smithers, Bishop's Stortford, United Kingdom

[73] Assignee: Plextek Limited, Great Chesterfield

[21] Appl. No.: 08/872,226

[22] Filed: Jun. 10, 1997

[51] Int. Cl.[7] .................................................. H04K 1/10
[52] U.S. Cl. ........................ 375/260; 375/130; 375/140; 375/219; 455/47
[58] Field of Search ..................................... 375/260, 219, 375/130, 140; 455/47, 67.1, 75; 370/483, 343

[56] References Cited

U.S. PATENT DOCUMENTS 4,955,083  9/1990  Phillips et al. ............................ 455/47
5,369,785  11/1994  Korhonen et al. ...................... 455/67.1
5,537,435  7/1996  Carney et al. ........................... 375/219
5,862,173  1/1999  Dent ........................................ 375/200

FOREIGN PATENT DOCUMENTS 2057816  1/1981  United Kingdom .
2261345  12/1993  United Kingdom .

*Primary Examiner*—Stephen Chin
*Assistant Examiner*—Shuwang Liu
*Attorney, Agent, or Firm*—Orum & Ruth

[57] ABSTRACT

A point to multipoint two-way communications systems in which a base station transmits to a remote station ("outstation") on a frequency derived by the base station from the frequency of a previous transmission received by said base station from said outstation.

2 Claims, 4 Drawing Sheets

COMMUNICATIONS SYSTEM

FIELD OF THE INVENTION

This invention relates to the field of digital communications system.

BACKGROUND OF THE INVENTION

National administration across the world allocate the usable radio frequency spectrum by splitting it into channels of fixed bandwidth. In Europe at VHF and UHF these allocated channels are typically 12.5 kHz wide.

Data is normally sent across these channels in a serial manner, each transmission using the whole channel. The desired data rate and the nominal tolerance of easily-producible frequency references (in the region of 10 parts per million) mean that such systems normally resolve the data over a relatively wide bandwidth (for example 7.5 kHz) which is a large proportion of the allocated channel bandwidth (12.5 kHz).

The fundamental sensitivity of such systems is limited by these bandwidths, the noise figure of the receiver and also any extraneous noise (natural or man-made) present at the receiver.

Many communications systems are limited by relatively low power availability. For example, telemetry applications such as the monitoring of gas meters are power-restricted in that, firstly the remote gas meters have no integral power sources of their own (therefore power must be supplied to them) and, secondly, safety regulations restrict the amount of power that is supplied in the vicinity of the potentially-dangerous gas supply.

For maximum communications range at low power, it is necessary to operate at a low bandwidth. (This reduces the speed at which information can be transmitted, but for many applications, this reduction is acceptable). Consequently, this requires that narrow band filtering is employed, with the wanted signals arriving in this narrow band. In order to achieve this, both the transmitter and receiver must operate with high frequency accuracy else the wanted signal will not be detected by the receiver.

This is a significant problem in communications systems (for example vehicle tracking systems) where there is a need for low cost transmitter units. The high accuracy components required would make the costs prohibitively high.

In our co-pending UK patent application entitled "DIGITAL COMMUNICATIONS" and filed on May 31, 1996, there is provided a digital communications system which seeks to increase the range of a transmitter without increasing its size or cost.

This is achieved by improving the sensitivity of the receiver (ie, enabling it to receive signals at a low signal strength) by implementing said receiver as a bank of narrow filters. Each filter is, effectively, an independent receiver listening to a part of the overall (12.5 kHz) channel. As such, noise power in each filter is reduced and sensitivity therefore increased.

In many applications, more sophisticated communication procedures could be employed if two-way point to multi-point communication were possible. However, although the sensitivity of the receiver at the base station (the "point") is improved using the above method, the same method would need to be employed in every individual outstation (the "multipoints"), again making the costs prohibitively high. Furthermore, there is a problem when considering a transmission from the base site to be received at an outstation because of the disparity in power available between the base station and each outstation, if path of equal range performance is required. As described above, range can be extended by reducing the bandwidth and this is achieved in the base station by the bank of narrow filters. However, for two-way communication where each path needs to operate at a similar budget of power and range, the outstation receiver must also be of narrow bandwidth. The low tolerance of the frequency reference in the desired low-cost multiple outstation is thus a problem again.

It is therefore an object of the present invention to provide a communications system optimised for low cost, power-efficient two-way communications with maximised range between a single base site and a multiplicity of low-cost outstations.

SUMMARY OF THE INVENTION

According to the present invention in its broadest aspect there is provided a point to multipoint two-way communications system in which a base station transmits to a remote station ("outstation") on a frequency derived by the base station from the frequency of a previous transmission received by said base station from said outstation.

Specifically, the communications system comprises a base station transceiver having a transmitter for transmitting a modulated data signal and a receiver having means for dividing a received channel into a plurality of narrow frequency bands; means for detecting the presence of data signals in individual ones of said narrow frequency bands; and, demodulation means for demodulating the data signals, the demodulation means including at least one narrow band filter centred on the detected data signal frequency bands; and at least one outstation transceiver having a transmitter for transmitting a modulated data signal and a receiver having at least one channel-defining filter, wherein, in use, said base station transmits to said outstation on a frequency derived by the base station from the frequency of a transmission previously-received by said base station from said outstation.

In a preferred form, said division, said detection and said demodulation are performed digitally in a digital signal processor.

Preferably, said outstation is normally de-activated to reduce power consumption and is activated in order to receive transmission from said base station after a pre-determined time delay relative to a previous transmission event.

In a preferred form, the receiver at said outstation transceiver is of the superheterodyne type with a single channel-defining filter.

Alternatively, said outstation receiver is implemented using a pair of filters as the channel-defining filters. In a preferred form, the filters are located at the outputs of a dual direct conversion receiver, said receiver incorporating single-sideband selection by the phasing method.

According to a second aspect of the invention there is provided a method of transmitting and receiving digital data, the method comprising the steps of:

1. Modulating a data signal, for example by FSK (frequency shift keying);
2. Transmitting said modulated data signal from a remote station ("outstation");
3. Receiving said modulated data signal at a base station;
4. Dividing a channel having said received signal into a plurality of narrow frequency bands;

5. Detecting the presence of data signals in individual ones of said narrow frequency bands;

6. Demodulating the detected data signals by at least one narrow band filter centred on the detected status signal frequency bands; and 7. Utilising said detected frequency bands to enable said base station to subsequently transmit a modulated data signal to said outstation.

It will be understood that the invention includes within its scope a two-way communication system substantially as described herein with reference to and as illustrated by any appropriate combination of the accompanying drawings.

DESCRIPTION OF THE PREFERRED EMBODIMENT

The radio communications system of the present invention comprises two types of transceiver or station. The base station 1 can be considered as the "point" of the point to multipoint communications system. A plurality of remote transceivers or outstations 2 are also provided; their number depending upon the particular application.

It is conceivable that there could also be more than one base station 1, and/or only one outstation 2, but for the purposes of this example, a system comprising a single base station 1 and a plurality of outstations 2 will be described.

Figure 1:
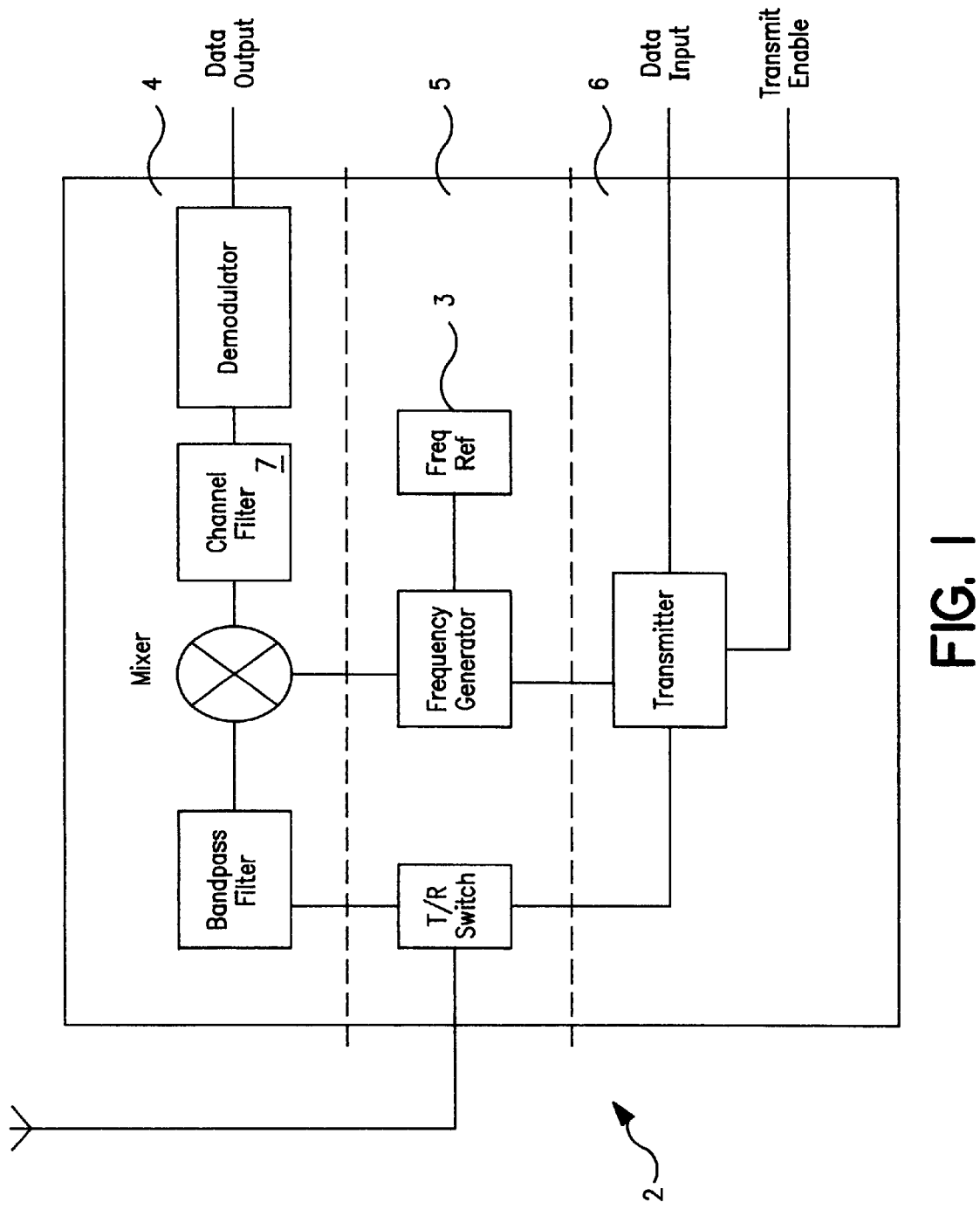
FIG. 1 is a block diagram of the outstation transceiver.

The principal requirement of each outstation 2 is that it should provide maximum range performance for minimum cost and power consumption. Referring specifically to FIG. 1, outstation 2 has a frequency reference 3 which is common to both the transmitting and receiving elements of the outstation. The tolerance requirements of frequency reference 3 are not excessively high. The total of the cutting, temperature and ageing tolerances need only be such that the transmission does not go outside the allocated frequency channel width (in the UK this is typically 12.5 kHz).

The uplink and downlink nominal frequencies do not need necessarily to be the same, however the relationship between them needs to be known. This may be fixed or may change with time according to an algorithm known to each end of the link (ie, both base station 1 and outstation 2).

Outstation 2 comprises a receiver 4, common elements 5 and a transmitter 6. Receiver 4 is a superheterodyne ("superhet") receiver having a single channel-defining filter 7.

Figure 3:
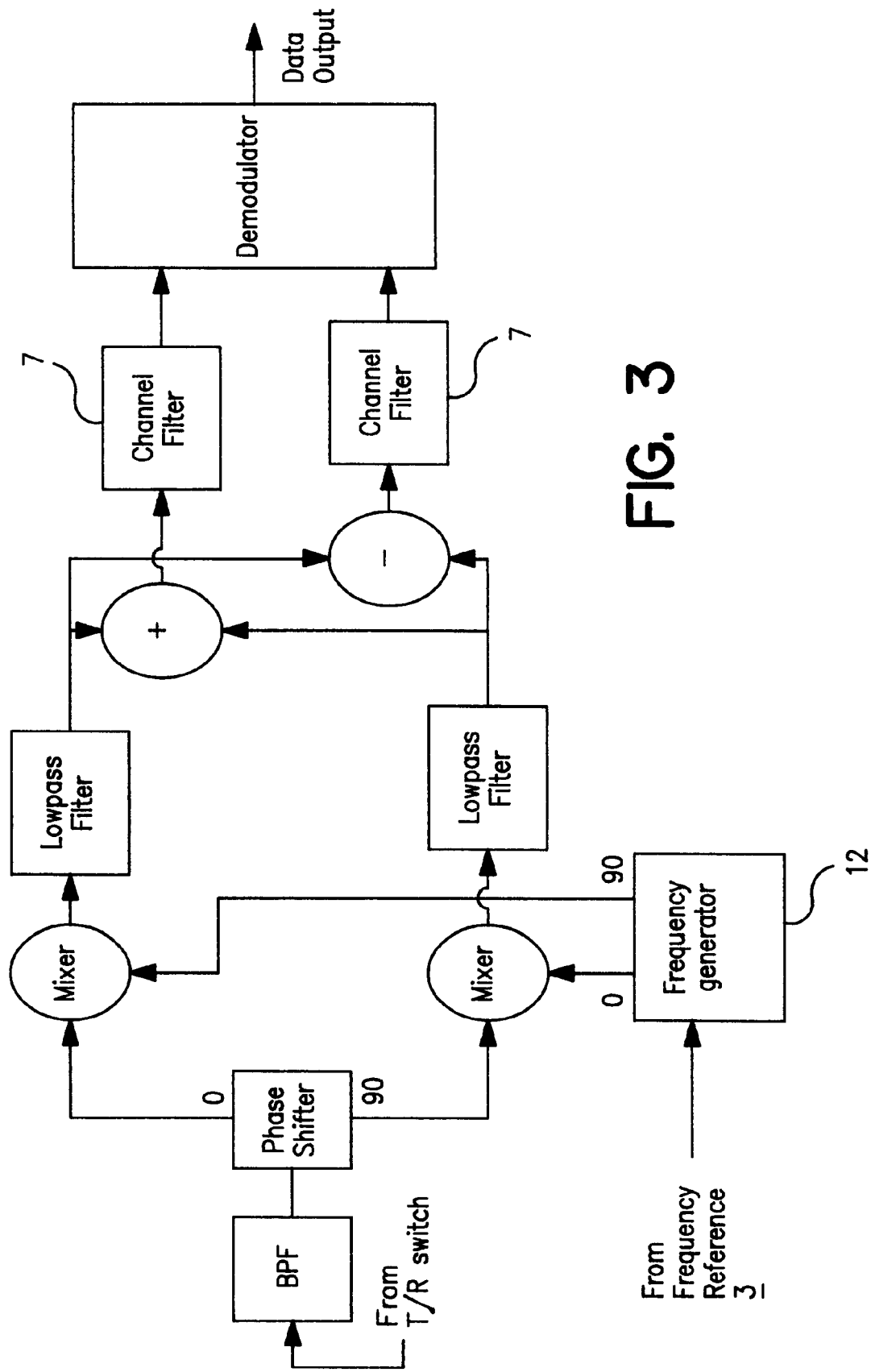
FIG. 3 is a block diagram of an alternative embodiment of the outstation receiver.

An alternative embodiment of the outstation receiver 4 is shown in FIG. 3 where a pair of filters are used as the channel defining filters 7. This is particularly suited to modulation of the base station transmission using directly-modulated frequency shift keying ("FSK") where the signal energy is substantially contained on two discrete frequencies within the channel. The filters would be placed at the outputs of a dual direct conversion receiver, said receiver incorporating single-sideband selection by the phasing method. This is known as an independent sideband (ISB) receiver. In use, the receiver input frequency becomes a pair of frequencies separated by twice the value of the centre frequency of channel filter 7.

Figure 4:
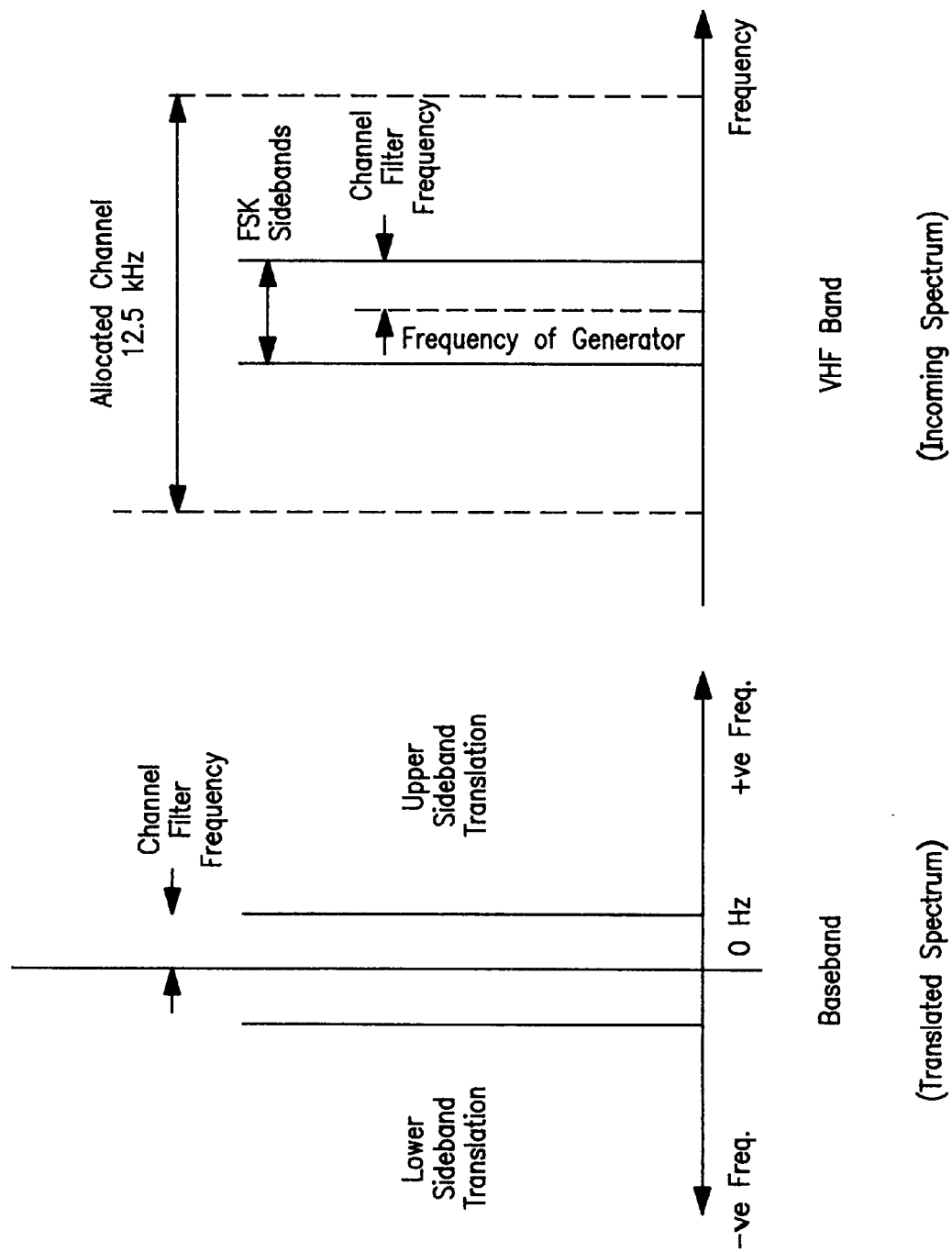
FIG. 4 is a diagram representing the frequency relationships of the receiver of FIG. 3.

In this method, signals arriving in the channel but higher in frequency than frequency generator 12 (the upper sideband) will arrive substantially at one output, and those at a lower frequency than that of frequency generator 12 (the lower sideband) will arrive substantially at the other output. When receiving a direct FSK signal then, each channel filter will contain only mark or space energy respectively. FIG. 4 is a diagram of the frequency relationships described here.

The outstation receiver 4 demodulates signals falling within its channel defining filter 7. In order to maximise link budget (and therefore range), channel defining filter 7 needs to be significantly narrower than the allocated channel. However, owing to the errors between the frequency reference 3 of the outstation 2 and the frequency reference of base station 1, base station 1 is not necessarily able to transmit a signal within the passband of receiver 4's channel defining filter 7.

In order to solve this problem, base station 1 needs to be able to determine the frequency of the outstation's transmission to a resolution which is as fine or finer than the bandwidth of the outstation's receiver channel defining filter 7. Once base station 1 has received a preliminary transmission from an outstation 2, the frequency of that transmission is known and hence the frequency reference 3 of that outstation can be determined. Once this is known, base station 1 can transmit to outstation 2 at will. Hence base station 1 can transmit to outstation 2 at the frequency of its receiver 4, even though the effective bandwidth of receiver 4 is very much narrower than the allocated channel.

The power consumption of each outstation 2, can be minimised if transmissions from base station 1 are only sent to individual outstations 2 at known times. Each outstation receiver 4 can then be de-activated at all other times. This is achieved by having receiver 4 only looking for a base station transmission at an appointed time relative to a previous transmission. Similarly, base station 1 only transmits signals at that appointed time. The base station 1, knowing when the last transmission was sent and on exactly which frequency, can establish precisely when to transmit to the appointed outstation 2. Errors in time accuracy can be engineered to match the errors in frequency reference, thus permitting accurate time predictions and consequently saving power.

Figure 2:
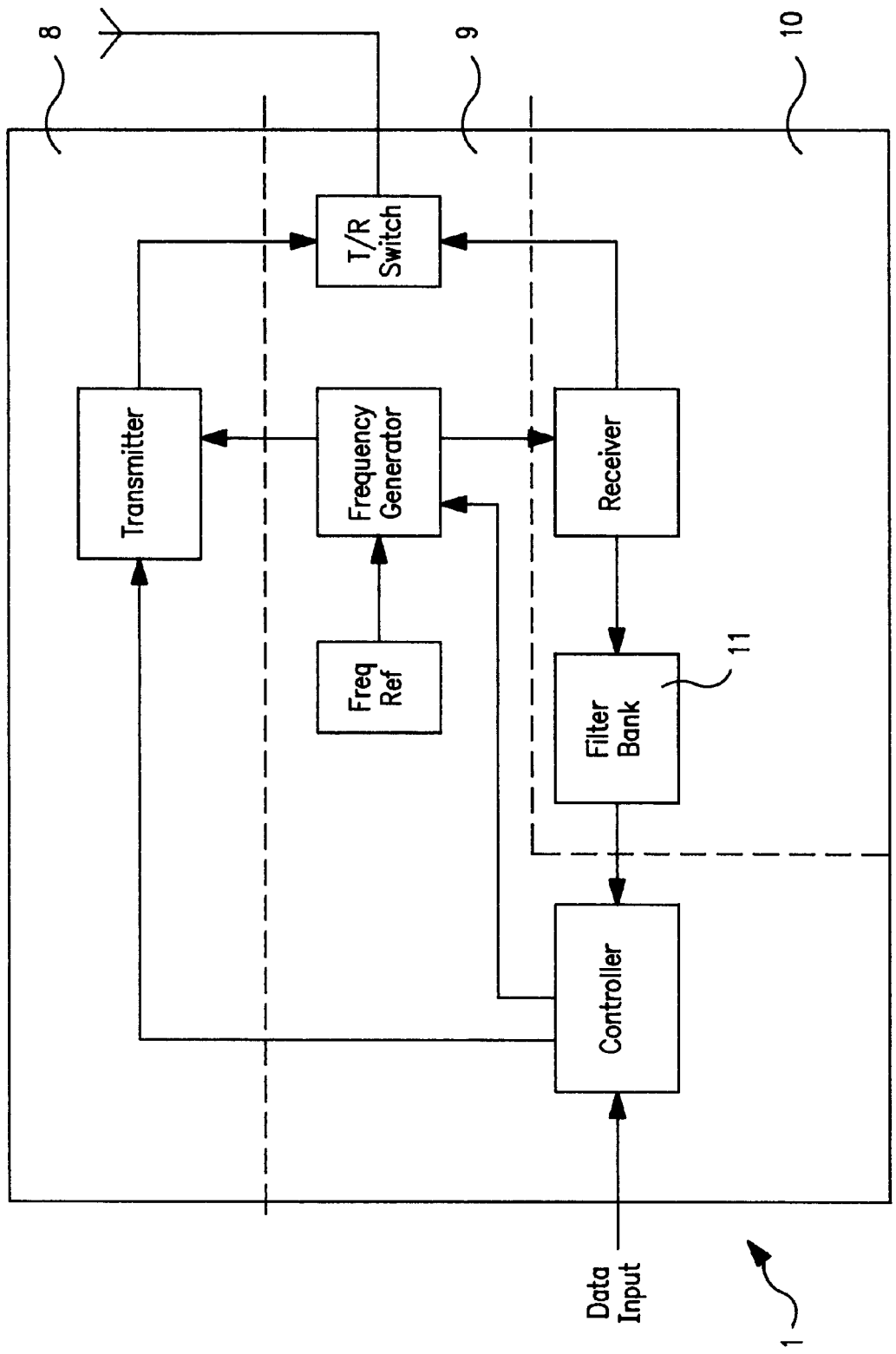
FIG. 2 is a block diagram of the base station transceiver.

Turning now to FIG. 2, base station 1 comprises a transmitter 8, common elements 9 and a receiver 10. Receiver 10 is implemented using a bank of filters 11, each narrower than the allocated channel. These may be achieved as individual filters or by signal processing means.

The output of filter bank 11 needs to be processed to establish the identity and the frequency of the incoming signal. The frequency of the incoming signal can be determined by either 1. identifying in which element of filter bank 11 the incoming signal is being detected; or 2. using the above only to identify the incoming signal and then subsequently employing an agile filter with its own frequency counting means to pin-point the frequency of the detected signal.

The identity of the received signal is then obtained by demodulation.

Having identified the frequency of an incoming signal from outstation 2 and noting the time, base station 1 is then in possession of the necessary information to subsequently transmit back to the outstation 2. This can even compensate for accumulated time errors, as the outstation's clock errors will also be known if they have been derived from the same frequency reference 3.

After synchronisation, the most significant errors which are likely to arise in the outstation frequency reference 3 will be as a result of temperature drift. It is possible, however, for outstation 2 to know what temperature environment it is in and therefore to calculate whether it may need to re-synchronise with base station 1.

The timing of re-synchronisation of outstation 2 with base station 1 needs to be determined for each individual implemented system. For example, the need to re-synchronise increases if base station 1 is also constructed using a poor tolerance frequency reference, or if the ratio of channel width to outstation filter receiver width is very high. Another need for regular re-synchronisation would occur if the outstation bandwidth as a proportion of centre frequency is very small (substantially less than 1 part per million).

Further enhancements could be made to the system if outstation 2, once synchronised with base station 1 and communications established, was informed of its own absolute frequency. It could then use this to correct subsequent errors. Following on from this, outstation 2 could maintain synchronisation with base station 1 by listening for a regular synchronisation broadcast from base station 1 (this is particularly suited to systems having a plurality of outstations 2). In the event of this synchronisation broadcast not being heard, (either owing to frequency drift of either station or owing to interference) the outstation 2 could automatically re-synchronise. The period of the synchronisation broadcasts could still be engineered to obtain great power savings over a system where the outstation has to receive on a continuous basis.

The system is not particularly sensitive to the modulation method used for transmissions. Amplitude, frequency or phase methods could be used provided that most of the signal energy passes through the narrow filter described above. If methods where energy is principally distributed on several discrete frequencies are used, filter bank techniques can take advantage of this to add diversity and avoid interference.

In a preferred embodiment said base station is able to substantially simultaneously transmit to more than one of said outstations and, similarly, is able to receive signals from more than one outstation substantially simultaneously so long as those signals are transmitted (by the outstations) at frequencies sufficiently different for the signals to be individually resolved.

Furthermore, in a full duplex system, said base station is able to transmit to one or more outstations at substantially the same time as receiving a signal or signals from other outstations, so long as the respective frequencies are different from one another.

If the system were operated on two frequencies as a duplex system, the implementation may use multiple frequency generators; it may be that the base station 1 is transmitting continuously. However, the use of a common or linked frequency reference would be necessary.

Many applications for the communications system of the present invention are envisaged, for example:

Security devices for objects or personnel, for status or location-tracking purposes (e.g. prisoner tagging, automatic vehicle location);

Telemetry devices, for example utilities metering;

Status monitoring of plant or storage systems;

Remote interrogation of sensors, for example for weather or environmental monitoring;

Wireless alarm systems, for example security (e.g. intruder) or safety (e.g. fire) applications.

What is claimed is:

1. A method of transmitting a receiving digital data, the method comprising the steps of Modulating a data signal, for example by frequency shift keying;

Transmitting said modulated data signal from a remote outstation station;

Receiving said modulated data signal at a base station;

Dividing the channel having said received signal into a plurality of narrow frequency bands;

Detecting the presence of data signals in individual ones of said narrow frequency bands;

Demodulating the detected signals by at least one narrow band filter on the detected status signal frequency bands; and Utilizing said detected frequency bands to enable said base station to subsequently transmit a modulated data signal to said outstation, said base station transmitting on a frequency derived from the frequency of a transmission previously received by said base station from said outstation.

2. A two-way communications system in which a base station transmits to a remote outstation, comprising:

a base station transceiver having a transmitter for transmitting a modulated data signal and a receiver having means for dividing a received channel into a plurality of narrow frequency bands; means for detecting the presence of data signal in individual ones of said narrow frequency bands; demodulating means for demodulating the data signals, the demodulation means including at least one narrow band filter centered on the detected data signal frequency bands; and at least one outstation transceiver having a transmitter for transmitting a modulated data signal and a receiver having at least one channel-defining filter, wherein said base station transmits to said outstation on a frequency derived by the base station from the frequency of a transmission previously received by said base station from said outstation, said outstation receiver is implemented using a pair of filters as the channel-defining filters, said filters are located at outputs of a dual direct conversion receiver, said conversion receiver incorporating single-side band selection by a phasing method.

* * * * *